United States Patent [19]
Frohreich et al.

[11] 4,128,405
[45] Dec. 5, 1978

[54] INCOMPLETE DRYING OF ACTIVATED CARBON IN A PROCESS FOR VCM REDUCTION IN VAPORS

[75] Inventors: Richard A. Frohreich, Norman; John F. Scamehorn, Ponca City, both of Okla.

[73] Assignee: Continental Oil Company, Ponca City, Okla.

[21] Appl. No.: 769,361

[22] Filed: Feb. 16, 1977

[51] Int. Cl.$^2$ .............................................. B01D 53/04
[52] U.S. Cl. .......................................... 55/59; 55/71; 55/74
[58] Field of Search ................... 55/59, 62, 71, 73, 74

[56] References Cited
U.S. PATENT DOCUMENTS

| | | | |
|---|---|---|---|
| 3,104,162 | 9/1963 | Skarstrom | 55/62 X |
| 3,138,439 | 6/1964 | Skarstrom | 55/62 X |
| 3,176,444 | 4/1965 | Kiyonaga | 55/62 X |
| 3,416,293 | 12/1968 | Alexander | 55/74 X |
| 3,598,521 | 8/1971 | Alley | 55/73 X |
| 3,721,066 | 3/1973 | Teller | 55/74 X |
| 3,736,726 | 6/1973 | Grimm et al. | 55/73 |
| 3,796,023 | 3/1974 | Raduly | 55/71 X |
| 3,984,218 | 10/1976 | Patel et al. | 55/74 X |
| 4,020,117 | 4/1977 | Sisson | 55/74 X |

Primary Examiner—Robert H. Spitzer
Attorney, Agent, or Firm—Cortlan R. Schupbach, Jr.

[57] ABSTRACT

A method for adsorbing VCM from vapors through the use of incompletely dried activated carbon under essentially adiabatic conditions allowing most of the VCM to adsorb on carbon having water previously adsorbed, the heat of adsorption of VCM desorbing the water instead of heating the carbon bed. The VCM adsorption is greater than that found on a dry bed when an adiabatic temperature rise is allowed to occur on the dry bed. A portion of the carbon bed can be kept dry if necessary to reach desired VCM levels. The advantage of the invention resides in adsorbing greater amounts of VCM per pound of carbon used, less drying necessary after regeneration, and less likelihood of high temperature deleterious reactions occurring.

7 Claims, 7 Drawing Figures

LOADING vs. RESIDUAL WATER AT 1.8 V/o VCM

FIGURE 1

LOADING vs. RISIDUAL WATER AT 33 V/o VCM

FIGURE 2

LOADING vs. FEED HUMIDITY ISOTHERMS
AT 3000 PPMV VCM CONCENTRATION

*FIGURE 3*

LOADING vs. FEED HUMIDITY ISOTHERMS
AT 10,000 PPMV VCM CONCENTRATION

FIGURE 4

LOADING vs FEED HUMIDITY ISOTHERMS
AT 20,000 PPMV VCM CONCENTRATION

FIGURE 5

OUTLET VCM CONCENTRATIONS vs. TIME
FOR PARTIALLY DRY BEDS

*FIGURE 6*

FIGURE 7

ADIABATIC LOADINGS AND TEMPERATURES vs. CONCENTRATION

INCOMPLETE DRYING OF ACTIVATED CARBON IN A PROCESS FOR VCM REDUCTION IN VAPORS

This invention relates to the use of activated carbon to reduce vinyl chloride monomer (VCM) concentrations in vapors. More specifically, this invention relates to the use of wet activated carbon to reduce VCM concentrations in vapors.

In 1974, VCM was declared a potential carcinogen. Subsequently, the carcinogenic nature of VCM has been verified and a number of United States government regulations have been published to reduce exposure to VCM. The environmental protection agency has published a regulation requiring that vented vapor streams contain no more than 10 parts per million volume (ppmv) VCM.

Carbon has been reported for adsorbing vinyl chloride from inert gases and for recovering unreacted vinyl chloride from polymerization processses. U.S. Pat. No. 3,796,023 describes such a process. Hydroquinone is well-known as an aid to adsorption of inert gases on active carbon as shown in German Offenlegungsschrift No. 2,148,954, French Pat. No. 2,156,496, and U.S. Pat. No. 3,796,023. In a state of the art process, the vapor would be passed over dry carbon with a subsequent heat rise of the vapor and carbon due to the heat of adsorption of VCM. The amount of VCM adsorbed on a given amount of carbon decreases with increased temperatures, so the heat rise due to adsorption decreases the capacity of the carbon bed. The bed is normally then regenerated (or VCM desorbed) using steam. The desorbed VCM is usually recovered and recycled in the process. The carbon bed is then dried of the water remaining on the carbon from the regeneration step. The adsorption step begins again and the cycle repeated.

The heat rise and subsequent loss in adsorption capability is shown in German Offenlegungsschrift No. 2,148,954 wherein the carbon is cooled before use in order to increase VCM adsorption capability. However, such a cooling capacity requires extra expense for equipment, maintenance and process time and greatly increases costs.

The effect of water vapor in VCM streams has been investigated when activated carbon is used to adsorb VCM. However, water vapor in the gas stream from which the VCM is to be adsorbed has a markedly different effect than water vapor adsorbed onto carbon at the start of the adsorption process. Water from vapor preferentially adsorbs onto carbon to the partial exclusion of VCM, thus decreasing VCM adsorption capacity of carbon. Water remaining on carbon after regeneration following saturation of VCM contains some dissolved VCM which is released from the carbon together with water when the water is driven from the carbon.

It would therefore be of great benefit to provide a process whereby removal of VCM from gas streams containing VCM is more easily carried out and has a greater efficiency than the methods currently used.

It is therefore an object of the present invention to provide a method for increasing the adsorption capability of carbon for VCM. Other objects will become apparent to those skilled in this art as the description proceeds.

It has now been surprisingly discovered that when activated carbon is only partially dried of water, the amount of VCM which can be adsorbed onto the carbon under essentially adiabatic conditions is increased. Thus, drying or removal of the water previously adsorbed is carried only to partial completion. The drying vapor is run countercurrent to the direction of the adsorption stream. The progress of the drying is monitored by a temperature sensor in the bed.

The term "essentially adiabatic" is used herein to indicate that the adsorption bed is treated as an adiabatic system while realizing that no real system is perfectly adiabatic, and that some heat transfer through materials used will occur. Under the process of this invention, however, these naturally occuring heat transfers will not be significant.

Vinyl chloride monomer (VCM) is only the most preferred ethylenically unsaturated monomer which can be removed from vapor streams. Other examples of such monomers which can be removed using the process described herein are vinylidene chloride, vinyl bromide, and vinylidene bromide. The dry region of the bed will thus be closest to the inlet of the drying stream. When VCM is again adsorbed on the bed, the wet region will be significantly cooler due to evaporative cooling.

When adsorption takes place in an activated carbon bed, most of the VCM will adsorb on the carbon with water adsorbed on it. The heat of adsorption of VCM will desorb the water instead of heating the carbon bed to a higher temperature, the heat exiting the bed as water vapor. Water on carbon is known to reduce the amount of VCM adsorbed over that adsorbed on dry carbon at the same temperature for high concentrations of VCM. It has been surprisingly discovered that VCM adsorbed on partially dry carbon can be greater than that adsorbed on dry carbon if an essentially adiabatic temperature rise is allowed to occur on the dry bed.

The present invention is directed toward high VCM concentrations in the gas stream from which VCM is to be adsorbed. Generally, the instant invention will not be effective for gas streams having VCM concentrations so low that sufficient heat to desorb water is not generated. Generally concentrations should be in the range of about 50,000 ppmv before adsorption and most preferably about 1,000,000 ppmv. There is no theoretical upper limit to the amount of VCM which can be present in the gas stream. However, in order to take advantage of the desorption of water, high adsorption rates of VCM must be maintained in order to drive the water from the carbon.

Prior art VCM adsorption on carbon has shown that at low flow rates, even when high concentrations of VCM are present, that channelizing or canaling of the stream through the carbon will take place. This channelizing or canaling forces the gas streams to pass through a relatively small portion of the bed along the same path, adsorbing VCM on the carbon directly adjacent the stream but having little or no adsorption throughout the rest of the bed. Thus VCM breakthrough can be found even when dry beds are used. Channelizing or canaling is greatly reduced in wet carbon beds; however a flow rate sufficiently high to prevent this effect is necessary. Generally, a flow rate of 0.05 feet per minute or higher based on the nitrogen flow through an empty bed (where VCM is not included) is desired for the purposes of the present invention.

VCM adsorbs in carbon beds in a narrow zone which moves through the bed as the VCM loads the carbon.

Because the zone has a finite length, the bed outlet VCM concentration is not a step function but is instead a steep curve or concentration wave. The breakthrough loading or loading at the point where the concentration wave reaches the outlet of the bed will usually exceed the maximum permissible VCM content of the outlet gas. These breakthroughs are usually detected at about 90% of the theoretical maximum equilibrium loading for carbon.

Water vapor content in the feed stream decreases loadings, and as water vapor in the feed stream becomes higher VCM loadings on carbon decrease. Loadings for a stream saturated with water at 43° C. can be as much as ¼ that loading obtained from a dry stream. The effect of humidity on loadings is less at higher temperatures, and the effect of temperature on loadings is less at higher humidities.

The effect of residual water left on the carbon when the carbon bed is dried incompletely prior to adsorption shows outlet VCM concentrations are less than 10 ppmv for a wide range of residual water levels. In contrast, current processes may show concentrations of VCM in the exit stream above 10 ppmv, requiring use of a dry guard bed for adsorption during the initiation of the adsorption cycle after regeneration. This "guard bed" of dry carbon is not necessary using the process of the instant invention.

Optimum water content of the carbon bed can vary greatly depending upon inlet VCM concentrations. When inlet VCM concentrations are between 100,000 and 1 million ppmv, optimum water content is about 0.12 to about 0.16 pounds of water per pound of carbon. At lower concentrations of about 20,000 parts per million VCM, optimum water content would be in the range of 0.03 to 0.06 pounds per pound of carbon. It must be realized that any water up to these optimum amounts is better than no water as far as maximum VCM adsorption on the carbon is concerned, since some heat will be removed by the water desorption.

The amount of water retained on the bed after regeneration will average about 0.06 pounds of water per pound of carbon. The normal procedure for drying the bed is to pass an air-flow in the opposite direction (countercurrently) to adsorption through the wet bed. Drying should take place at at least 150° F. to give practical drying times, although lower temperatures are possible. Nitrogen, air or other dry, non-reactive gas can be used as the drying medium and give equally good results. While no theoretical upper limit exists on the drying temperature, around 1,000° F. will be the practical upper limit based on machine limitations. Flow rate of drying air is not important but normally will be greater than 1 foot per minute and less than 200 feet per minute linear superficial velocity, based upon machine limitations.

Drying counter-currently will yield a water profile for the water remaining in the bed. While amounts of water remaining will be from 0.03 to 0.16 pounds per pound of carbon as an average, the water profile will range from nearly dry at the inlet of the drying air, to extremely wet at the outlet of the drying air (inlet of the feedstream containing the VCM to be adsorbed). This system of water profile helps to solve a problem associated with wet activated carbon.

At the beginning of the adsorption cycle when using wet carbon bed systems, the VCM concentrations in the vapor exiting the wet carbon can be greater than that exiting in an equivalent dry bed. Therefore, it is necessary to have a dry portion of the carbon bed through which the vapor passes before exiting the bed in order to reduce the VCM concentration to an acceptable level. Since the VCM concentrations in the vapor reaching the dry portion of the bed immediately prior to outlet are substantially lower than the initial VCM concentration, het rise due to heat of adsorption will be small in this part of the bed, and will not raise the temperature outside the optimum temperature range required for maximum adsorption.

The advantages of the instant process are several. Bed capacities for adsorbed VCM are increased, allowing either increased adsorption and greater capacity or decreased bed size for a constant capacity. In addition, decreased costs relating to both capital and operating costs of the drying step are obtained due to the decreased amount of water to be desorbed. Because of the reduced temperature obtained from the water desorption there is a decreased risk of reaction in the carbon bed, such as polymerization, vinyl chloride monomer dehydrochlorination, and carbon corrosion of steel which can occur at higher temperatures. These reactions are known to produce corrosive products such as hydrochloric acid and to reduce carbon activity.

The invention is more concretely described with reference to the examples below wherein all parts and percentages are by weight unless otherwise specified. The examples are intended to examplify the present invention and should not be construed to limit it.

Activated carbon used in all studies was Calgon, PCB 12X30, a coconut shell base carbon sold by Calgon Chemical Company. Other activated carbons from other sources are of course effective, such as those derived from liquid, solid, or gaseous hydrocarbons. The form of the carbon is not critical, although, particulate carbon having a size sufficiently uniform to prevent "dead" spots in the bed are preferred.

EXAMPLE 1

Figure 1:
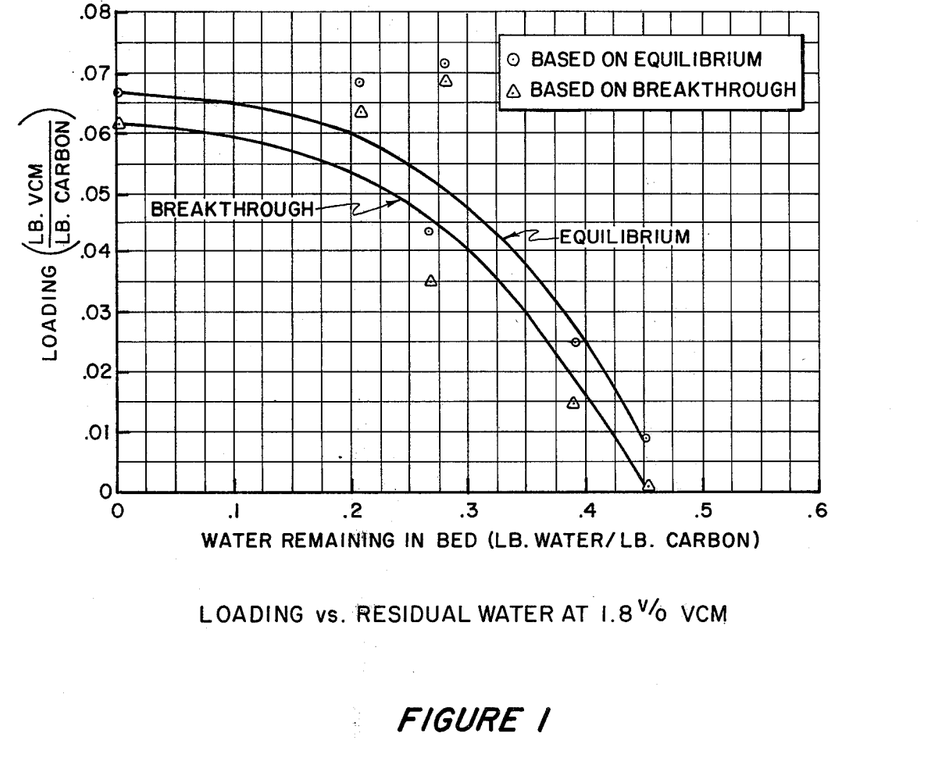

The effect on loadings of leaving a fraction of the water of regeneration in the carbon bed was investigated. The rate of removal of water from the bed during drying decreased in approximately an exponential relationship with respect to time. Regeneration conditions were held as constant as possible during each test. The carbon bed was at 100° C. at the end of each regeneration. Loading vs amount of water remaining in the bed is shown in FIG. 1 for loading conditions of 1.8 volume percent vinyl chloride monomer is air having a humidity of 0.087 pounds of water per pound of dry air at 66° C. The data points show breakthrough loadings as well as equilibrium loadings.

Figure 2:
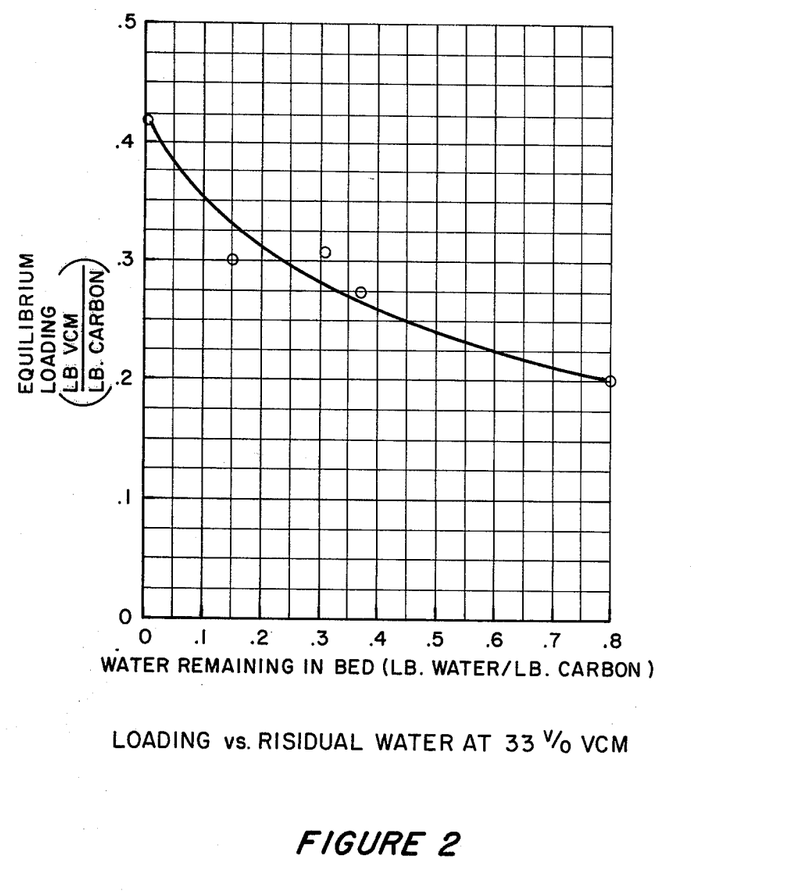

A comparable test was carried out using a dry feedstream. In this example, the most accessible sites are occupied by residual water with the less accessible sites becoming occupied with each additional unit of water added. The reduction in loading for each unit of residual water added is greatest at the low residual water end of the curve and decreases as the total water remaining increases. FIG. 1 indicates that the initial units of residual water adsorbed on carbon have little effect on a stream having high humidity. The loading reduction normally expected by residual water is caused by stream humidity, and the small amount of residual water remaining does not further effect the loading reduction to an appreciable extent. FIG. 2 shows equilibrium loadings for various concentrations of water on carbon for a dry feed stream.

EXAMPLE 2

Figure 3:
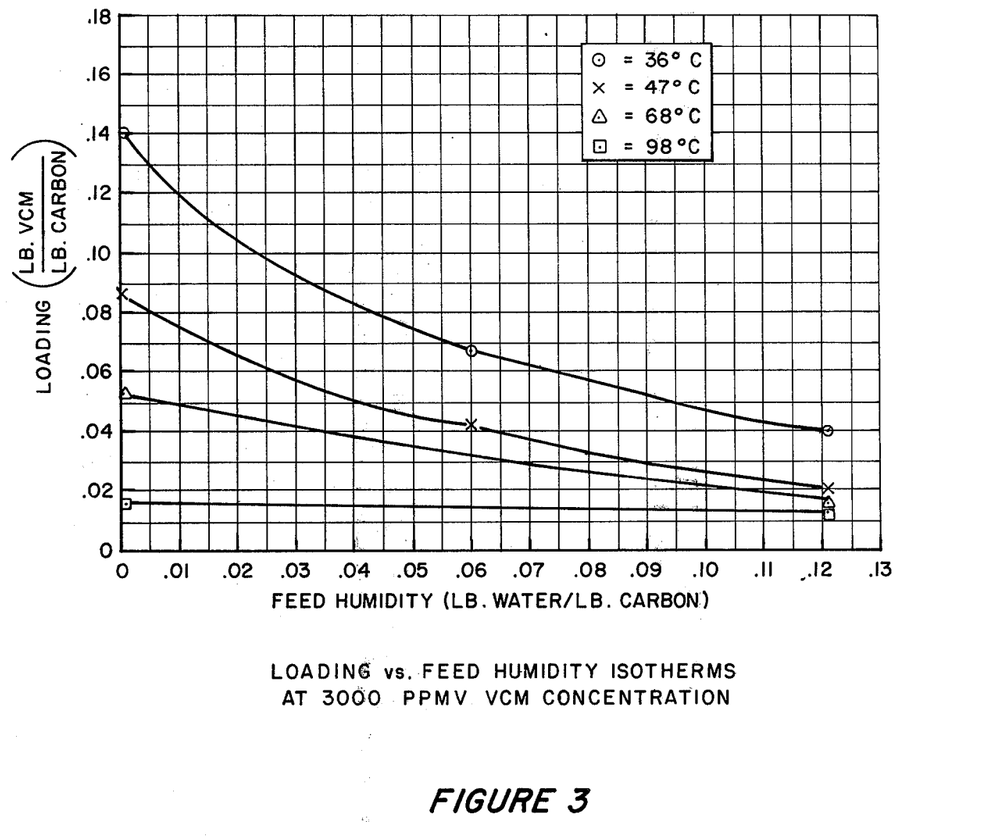
Figure 4:
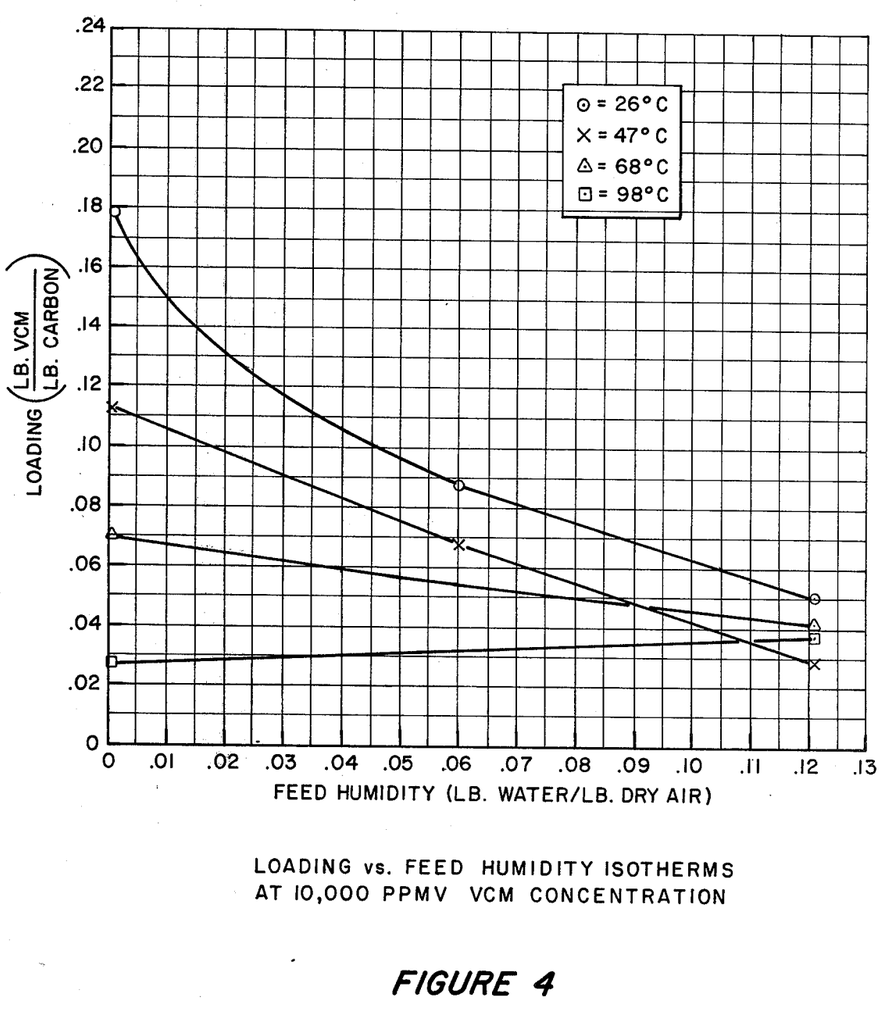
Figure 5:
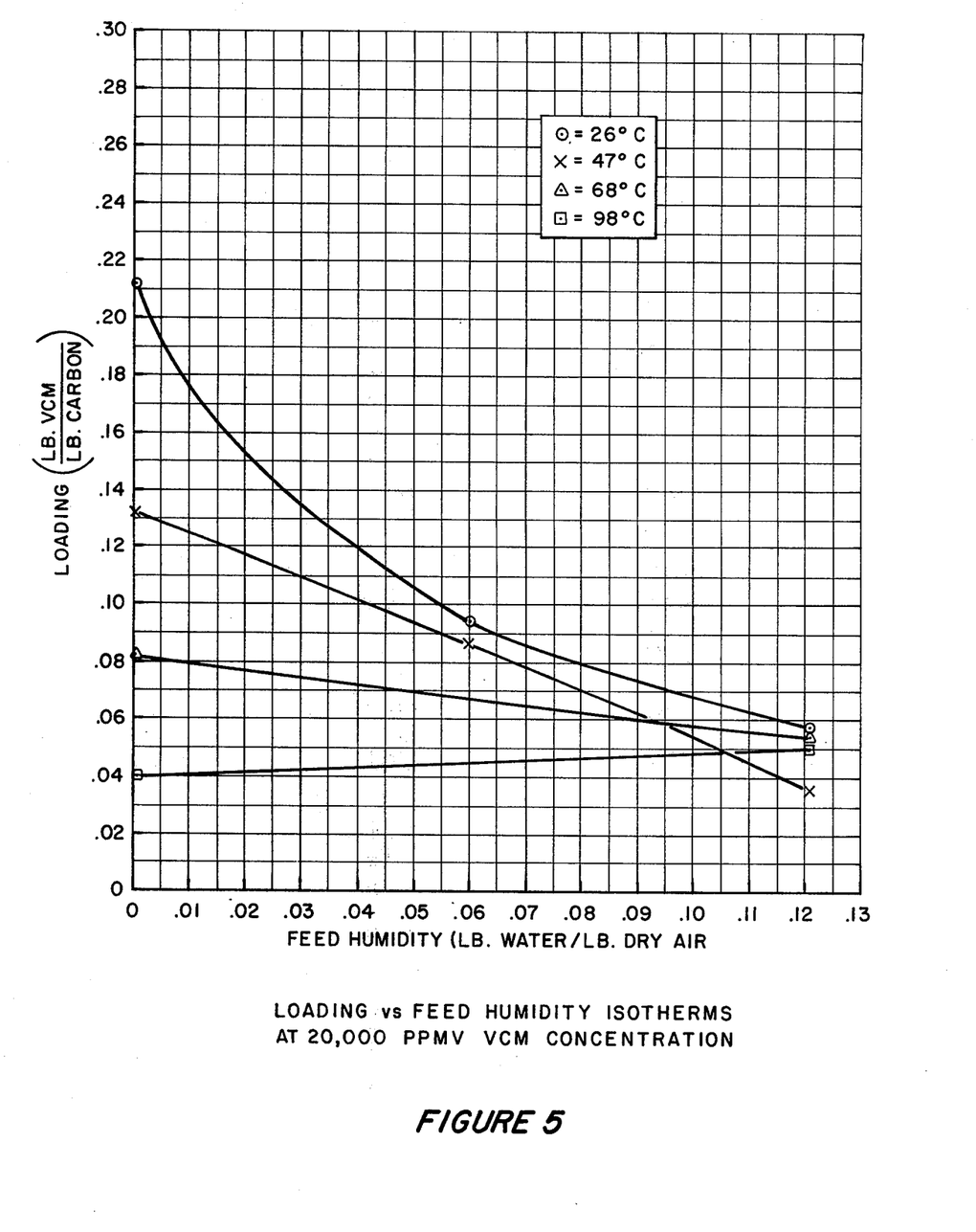

Equilibrium loading vs feed humidity isotherms are shown for VCM concentrations of 3,000, 10,000 and 20,000 ppmv in FIGS. 3-5. These experiments show that the higher the humidity, the less effect temperature has on loading, and the higher the temperature, the less effect humidity has on loadings.

The concentration wave increases with the amount of initial residual water until the length of the wave is greater than the bed length and the breakthrough loading is '0' as shown in FIG. 1.

FIGS. 3, 4, and 5 show the effect of humidity on gas streams fed into a dry bed. The water in the vapor stream appears to compete with VCM present for available adsorption sites on the carbon, resulting in a decrease in VCM adsorption.

EXAMPLE 3

The effect of residual water on pre-concentration wave outlet VCM concentrations was tested at flow rates of around 2.3 feet per minute (based on nitrogen on dry bed) and vinyl chloride monomer concentrations of about 60 volume percent VCM for various stages of drying and temperature. Runs 1 and 2 were on carbon beds regenerated once in a normal manner and runs 3, 4, and 5 were on beds that were freed of VCM by an extra regeneration. The results are shown in FIG. 6.

These results show that at extremely high residual water levels on carbon the outlet VCM concentration before the high concentration (called preconcentration wave in this disclosure) will be above 10 ppmv due to a leakage effect alone. During adsorption in the normal cycle, this VCM concentration would be above 10 ppmv during part of the cycle unless only a small amount of residual water is present, due mainly to VCM adsorbed with the water on the carbon which is dissolved with the water and passes the bed without readsorption. When a water profile on the carbon is obtained as described above, no leakage was observed.

Figure 6:
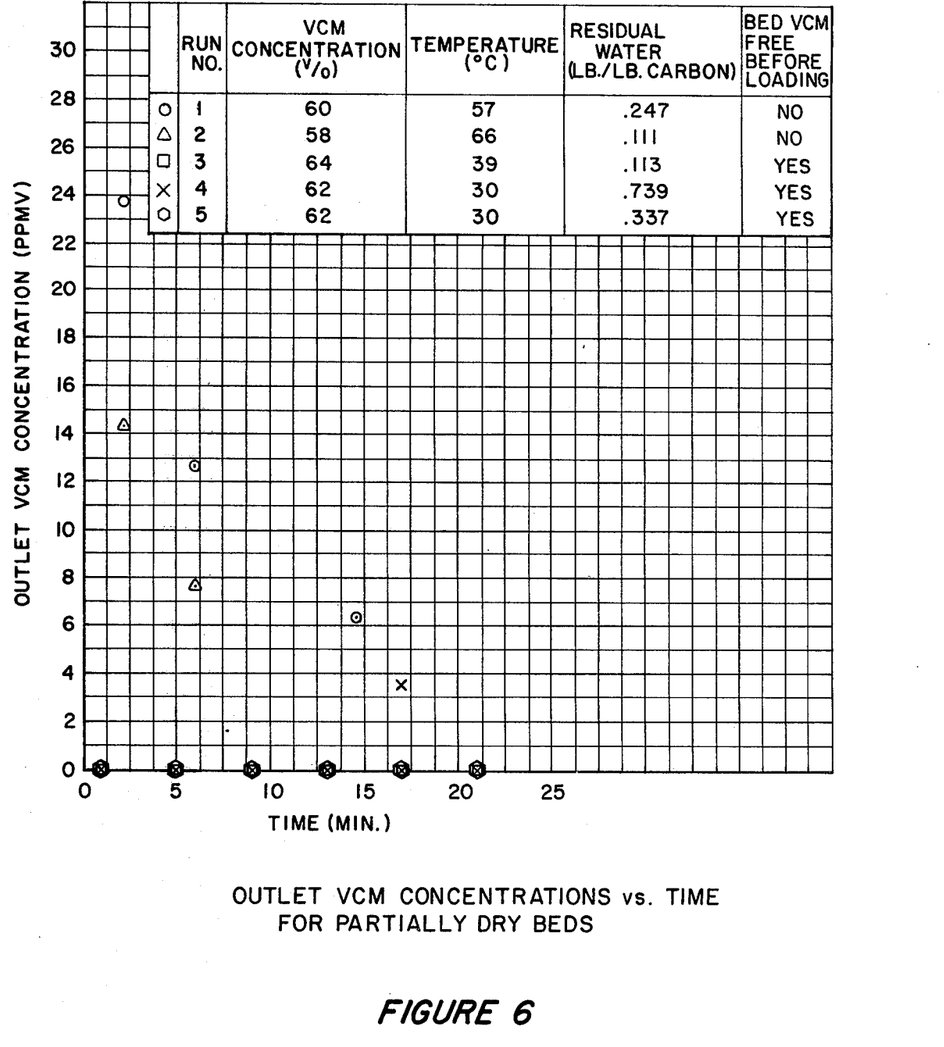

FIG. 6 illustrates the preconcentration breakthrough of VCM found when a regenerated wet bed is not completely dried. Apparently the VCM emitted is dissolved in or trapped by water remaining on the carbon. As the VCM is the feed stream is adsorbed, the water and the VCM dissolved in or trapped by it is drived off, the exits the bed. In the instant invention, the dry portion of the bed nearest the outlet prevents VCM escape.

Figure 7:
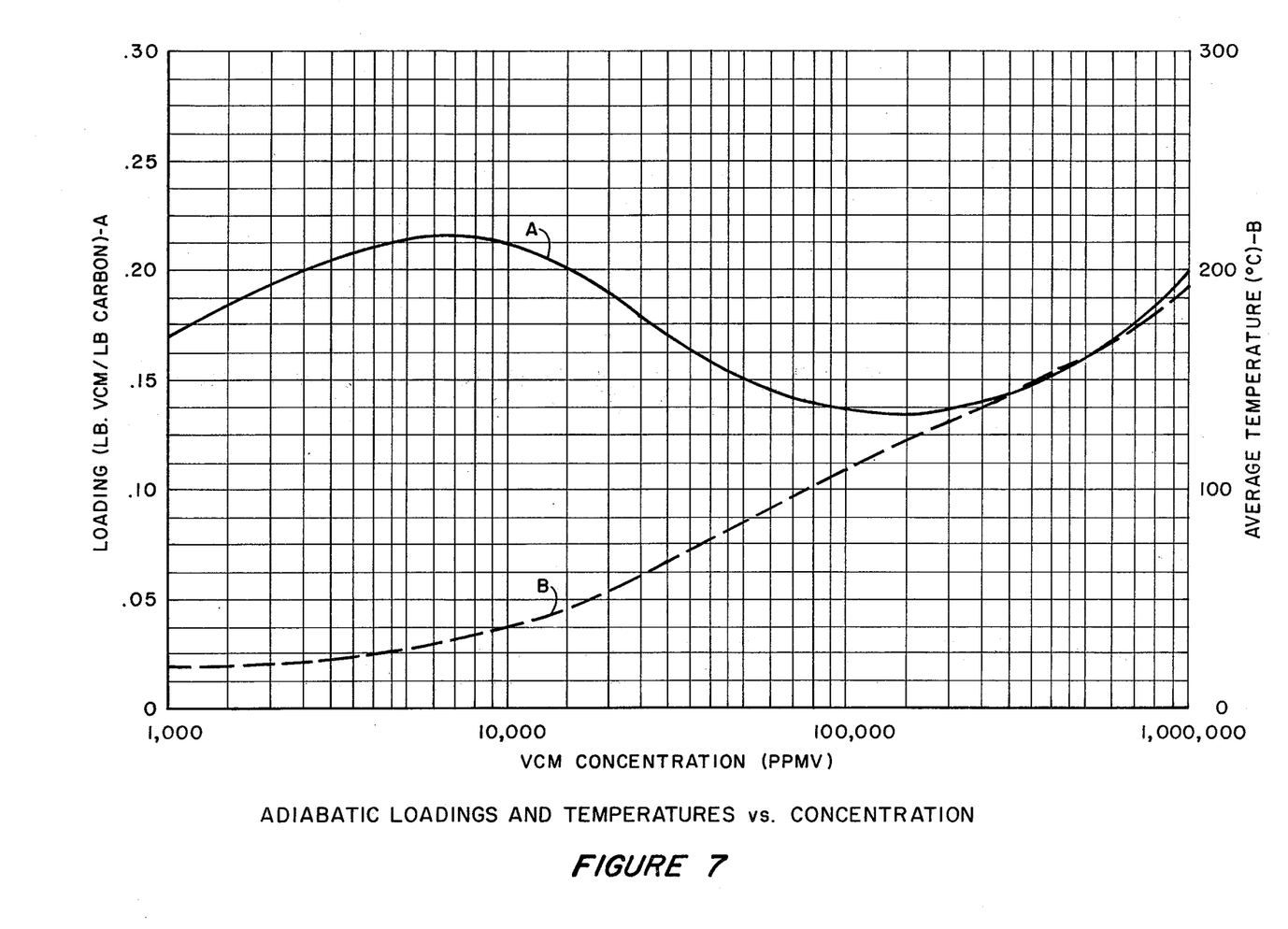

FIG. 7 estimates essentially adiabatic loadings and temperatures as a function of VCM concentration for comparative purposes, using vapor and initial carbon temperatures of 4° C. and 38° C. respectively. These loadings and temperatures can be simulated for any conditions desired wherein a wet bed and proper concentrations of incoming VCM will give higher adsorpiton then dry beds alone.

While certain embodiments and details have been shown for the purpose of illustrating this invention, it will be apparent to those skilled in this art that various changes and modifications may be made herein without departing from the spirit or the scope of the invention.

We claim:

1. In a process for removing ethylenically unsaturated monomer halides from an effluent stream containing the same bypassing the stream through particulate activated carbon to adsorb the monomeric halides on the activated carbon under essentially adiabatic conditions, the improvement therein of increasing the adsorption capability of the activated carbon which comprises, prior to passing the stream through the activated carbon, rendering the activated carbon to a state of incomplete dryness wherein the average water content is from about 0.03 to about 0.16 pounds of water per pound of carbon across the carbon, such that the carbon nearest the incoming stream contains a high concentration of water and the carbon adjacent the outlet is nearly dry, said effluent stream containing sufficient unsaturated monomer halide to desorb water from the carbon at the inlet of the carbon, whereby during passage of the stream through the activated carbon the heat of adsorption of the monomeric halide desorbs water from the activated carbon, thus controlling the temperature of the activated carbon at a level favorable to increased monomeric halide adsorption without the necessity for any external cooling.

2. A method as described in claim 1 wherein the initial VCM concentration is at least 50,000 ppmv.

3. A method as described in claim 2 wherein the flow rate of the vapor stream containing VCM is at least 0.5 feet per minute superficial velocity based on a nitrogen flow through an empty bed in the absence of VCM.

4. A method as described in claim 3 wherein the activated carbon is regenerated by driving off adsorbed VCM using steam.

5. In an improved process for removing vinyl chloride monomer from polyvinyl chloride reactor effluent using activated carbon to adsorb said vinyl chloride monomer in a carbon bed, said carbon bed becoming loaded, said carbon being regenerated by desorbing vinyl chloride monomer using steam and drying said carbon prior to use, the improvement comprising (a) passing steam through the loaded carbon bed to remove adsorbed vinyl chloride monomer leaving said carbon essentially wet; (b) partially drying said carbon to an average water content of from about 0.03 to about 0.16 pounds of water per pound of carbon using a dry gas flow, said gas flow being reversed from the direction of vinyl chloride monomer adsorption; (c) passing polyvinyl chloride reactor effluent containing sufficient vinyl chloride monomer to desorb water from carbon over said partially dried carbon under essentially adiabatic conditions wherein the heat of adsorption of vinyl chloride monomer desorbs some of the remaining water, maintaining temperatures in the carbon bed at levels favorable to vinyl chloride monomer adsorption without the necessity for any external cooling.

6. A method as described in claim 5 wherein the average water content after drying is from 0.12 to 0.16 pounds of water per pound of carbon.

7. A method as described in claim 5 wherein the reactor effluent of step (c) contains from 100,000 to 1 million ppmv VCM.

* * * * *

UNITED STATES PATENT OFFICE
CERTIFICATE OF CORRECTION

PATENT NO. : 4,128,405
DATED : December 5, 1978
INVENTOR(S) : John F. Scamehorn and Richard A. Frohreich It is certified that error appears in the above-identified patent and that said Letters Patent are hereby corrected as shown below:

Column 3, line 41, "0.06" should be --0.6--.

Column 4, line 7, "het" should be --heat--.

Column 4, line 28, "examplify" should be --exemplify--.

Column 4, line 65, "effect" should be --affect--.

Column 5, line 31, after concentration, the word "wave" was omitted.

Column 5, line 47, "the" should be --and--.

Claim 1, line 3, "bypassing" should be --by passing--.

Signed and Sealed this

First Day of May 1979

[SEAL]

Attest:

RUTH C. MASON
Attesting Officer

DONALD W. BANNER
Commissioner of Patents and Trademarks